(12) United States Patent
Leng et al.

(10) Patent No.: US 11,275,683 B2
(45) Date of Patent: Mar. 15, 2022

(54) METHOD, APPARATUS, DEVICE AND COMPUTER-READABLE STORAGE MEDIUM FOR STORAGE MANAGEMENT

(71) Applicant: BEIJING BAIDU NETCOM SCIENCE AND TECHNOLOGY CO., LTD., Beijing (CN)

(72) Inventors: Xianglun Leng, Beijing (CN); Yong Wang, Beijing (CN); Wei Qi, Beijing (CN); Zhengze Qiu, Beijing (CN); Yang Yan, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/942,434

(22) Filed: Jul. 29, 2020

(65) Prior Publication Data

US 2021/0034517 A1 Feb. 4, 2021

(30) Foreign Application Priority Data

Jul. 31, 2019 (CN) .......................... 201910702452.7

(51) Int. Cl.
   *G06F 12/02* (2006.01)
   *G06F 7/72* (2006.01)
   *G06F 12/1045* (2016.01)

(52) U.S. Cl.
   CPC .......... *G06F 12/0292* (2013.01); *G06F 7/721* (2013.01); *G06F 12/0246* (2013.01); *G06F 12/1045* (2013.01)

(58) Field of Classification Search
   CPC .. G06F 12/0246; G06F 12/0292; G06F 7/721; G06F 12/1045

(Continued)

(56) References Cited

U.S. PATENT DOCUMENTS

| 10,180,866 B2 | 1/2019 | Ackaret et al. |
| 2015/0095595 A1 | 4/2015 | Wang et al. |

(Continued)

FOREIGN PATENT DOCUMENTS

| JP | H06161884 A | 6/1994 |
| JP | 2016532926 A | 10/2016 |
| WO | 2018188618 A | 10/2018 |

OTHER PUBLICATIONS

Extended European Search Report for Application No. 20166750.8, dated Jan. 15, 2021, 8 pages.

(Continued)

*Primary Examiner* — Hua J Song
(74) *Attorney, Agent, or Firm* — Fay Sharpe LLP

(57) ABSTRACT

Example embodiments of the present disclosure provide a method, an apparatus, a device and a computer-readable storage medium for storage management. The method for storage management includes: obtaining an available channel mode of a plurality of channels in a memory of a data processing system, the available channel mode indicating availabilities of the plurality of channels, and each of the plurality of channels being associated with a set of addresses in the memory; obtaining a channel data-granularity of the plurality of channels, the channel data-granularity indicating a size of a data block that can be carried on each channel; obtaining a target address of data to be transmitted in the memory; and determining a translated address corresponding to the target address based on the available channel mode and the channel data-granularity.

12 Claims, 8 Drawing Sheets

(58) Field of Classification Search
USPC .......................................................... 711/154
See application file for complete search history.

(56) References Cited

U.S. PATENT DOCUMENTS

| | | |
|---|---|---|
| 2016/0226878 A1 | 8/2016 | Soulie et al. |
| 2017/0162235 A1 | 6/2017 | De et al. |
| 2018/0150255 A1* | 5/2018 | Woo ...................... G06F 3/0635 |
| 2019/0361807 A1* | 11/2019 | Desai .................. G06F 12/0607 |

OTHER PUBLICATIONS

Office Action for Japanese Application No. 2020-117658, dated Jun. 29, 2021, 4 pages.

* cited by examiner

500 ↘

| Target Address | Original Channel | Intra-channel Address | Available Channel Option | Determined Available Channel | Translated Address |
|---|---|---|---|---|---|
| 0X00_XX | 0 | 0 | 0 | 0 | 0X00_XX |
| 0X01_XX | 1 | 0 | 1 | 1 | 0X01_XX |
| 0X02_XX | 2 | 0 | 2 | 2 | 0X02_XX |
| 0X03_XX | 3 | 0 | 3 | 4 | 0X04_XX |
| 0X04_XX | 4 | 0 | 4 | 5 | 0X05_XX |
| 0X05_XX | 5 | 0 | 5 | 7 | 0X07_XX |
| 0X06_XX | 6 | 1 | 0 | 0 | 0X08_XX |
| 0X07_XX | 7 | 1 | 1 | 1 | 0X09_XX |
| 0X08_XX | 0 | 1 | 2 | 2 | 0X0A_XX |

FIG. 5 ered in various manners and should not be construed as limited to the embodiments set forth herein. On the contrary, these embodiments are provided for a more thorough and complete understanding of the present disclosure. It should be understood that the drawings and embodiments of the present disclosure are only for illustration, rather than limiting the protection scope of the present disclosure.

METHOD, APPARATUS, DEVICE AND COMPUTER-READABLE STORAGE MEDIUM FOR STORAGE MANAGEMENT

CROSS REFERENCE TO RELATED APPLICATION

This application claims priority under 35 U.S.C. § 1.19(a) on Chinese Patent Application No. 201910702452.7, filed with the State Intellectual Property Office of P. R. China on Jul. 31, 2019, the entire contents of which are incorporated herein by reference.

TECHNICAL FIELD

Embodiments of the present disclosure mainly relate to the field of storage, and more particularly, to a method, an apparatus, a device and a computer-readable storage medium for storage management.

BACKGROUND

Currently, data processing, system (e.g., chips) has been increasingly more common. However, as the size of the data processing system becomes smaller and smaller with the development of the manufacturing process, the yield of the data processing system decreases rapidly. For example, the yield of a data processing system manufactured by a 7 nm manufacturing process is typically 60-70%. In addition, with the development of artificial intelligence (AI) technology, processing capability of the data processing system (for example, a graphics processing unit (GPU) or an AI chip) is constantly improving. Consequently, the above factors lead to an ever-increasing scale of the data processing system, and increasing requirements of bandwidth for access to the memory associated with the data processing system. For example, a common area of AI chips is usually 500 $mm^2$, and can even be as high as 800 $mm^2$. However, the larger the area of the data processing system is, the lower the yield becomes.

SUMMARY

Example embodiments of the present disclosure provide a solution or storage management.

In a first aspect of the present disclosure, a method for storage management is provided. The method comprises: obtaining an available channel mode of a plurality of channels in as memory of a data processing system, the available channel mode indicating availabilities of the plurality of channels, and each of the plurality of channels being associated with a set of addresses in the memory; obtaining a channel data-granularity of the plurality of channels, the channel data-granularity indicating a size of a data block that can be carried on each channel; obtaining a target address of data to be transmitted in the memory; and determining a translated address corresponding to the target address based on the available channel mode and the channel data-granularity.

In a second aspect of the present disclosure, an apparatus for storage management is provided. The apparatus comprises: an available channel mode obtaining module, configured to obtain an available channel mode of a plurality of channels in a memory of a data processing system, the available channel mode indicating availabilities of the plurality of channels, and each of the plurality of channels being associated with a set of addresses in the memory; a channel data-granularity obtaining modulo, configured to obtain a channel data-granularity of the plurality of channels, the channel data-granularity indicating a size of a data block that can be carried on each channel; a target address obtaining module, configured to obtain a target address of data to be transmitted in the memory; and a determination module, configured to determine a translated address corresponding to the target address based on the available channel mode.

In a third aspect of the present disclosure, an electronic device is provided. The electronic device comprises: one or more processors; and a storage device, configured to store one or more programs, wherein when the one or more programs are executed by the one or more processors, the one or more processors are configured to implement the method according to the first aspect of the present disclosure.

In a fourth, aspect of the present disclosure, a computer-readable storage medium is provided. A computer program is stored on the computer-readable storage medium. When the program is executed by a processor, the program implements the method according to the first aspect of the present disclosure.

It should be understood that what is described in the Summary is not intended to limit key or important features of the embodiments of the present disclosure, nor is it intended to limit the scope of the present disclosure. Other features of the present disclosure will become readily understood from the following description.

BRIEF DESCRIPTION OF THE DRAWINGS

The above and other features, advantages, and aspects of the embodiments of the present disclosure will become more apparent with reference to the accompanying drawings and the following detailed description. In the drawings, the same or similar reference numerals indicate the same or similar elements.

FIG. 5 is a schematic diagram showing dynamic address mapping according to some embodiments of the present disclosure.

DETAILED DESCRIPTION

Figure 1:
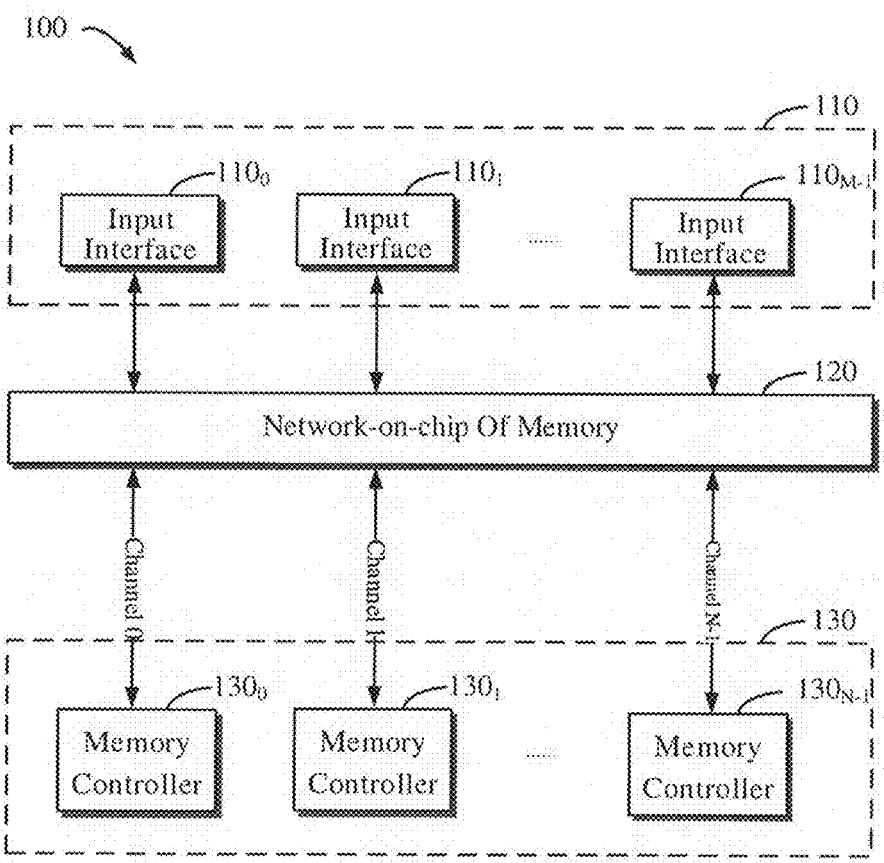
FIG. 1 is a schematic diagram showing a conventional memory.

Embodiments of the present disclosure will be described in more detail below with reference to the accompanying drawings. While certain embodiments of the present disclosure have been illustrated in the accompanying drawings, it is to be understood that the present disclosure may be embodied in various forms and should not be construed as being limited to the embodiments set forth herein. Instead, these embodiments are provided for a thorough and complete understanding of the present disclosure. It should be understood that the drawings and embodiments of the present disclosure are for illustrative purposes only and are not intended to limit the scope of the present disclosure.

In the description of the embodiments of the present disclosure, the term "include" and its equivalents should be construed as open-ended inclusions, i.e., "include, but is not limited to". The term "according to" is to be understood as "at least partially according to". The term "an embodiment" or "the embodiment" should be understood as "at least one embodiment". Terms "first", "second" and the like may refer to different or identical objects. Other explicit and implicit definitions may also be included below.

The term "data processing system" may refer to a chip, such as a central processing unit (CPU), a GPU, or an AI chip. However, the data processing system is not limited to this, and it may be any device capable of transmitting data through a channel.

As mentioned above, the processing capability of the data processing system is constantly increasing, resulting in increasing requirements for the bandwidth to access the memory associated with the data processing system. Single-channel memory could not provide the bandwidth necessary for some applications (such as the AI application). Accordingly, the data processing system adopts multi-channel interleaving technology to increase the bandwidth of the memory. The greater the number of interleaved channels is, the wider the bandwidth is, i.e. the lager the area of the memory controller (including the physical layer) becomes. Take an 8th-channel Graphics Double Data Rate version 6 (GDDR6) memory as an example, which provides a bandwidth of about 384 GB/s. For an AI chip of about 300 mm², such a GDDR6 memory occupies about 20% of the area of the AI chip.

Conventionally, data to be transmitted is statically mapped to a channel for data transmission. With such a static mapping approach, if one or more channels fail to pass the automatic test equipment (ATE) test due to the manufacturing process, such as a scan failure in a channel, the data processing system is considered as being defective and unavailable. In addition, even for those data processing systems that have passed the ATE test, they would still suffer from degradation that may be accelerated by high power consumption and high temperature during their service period in certain applications, such as AI applications, and lead to instability and even damages in one or more channels. For example, GPUs on the computing devices for obtaining Bitcoin usually become instable and need to be replaced in about one year, which is far shorter than die average service life of the data center servers.

The structure of such a conventional memory 100 will be described with reference to FIG. 1. As described above, the data processing system may adopt the multi-channel interleaving technology to increase the bandwidth of the memory. As for interleaving in a memory with N channels, a network-on-chip of memory (NoC_Mem) may adopt, for example, an M*N crossbar for connecting input interfaces to memory controllers, where M and N are positive integers.

As shown in FIG. 1, the memory 100 includes M input interfaces $110_0$-$110_{M-1}$ (hereinafter collectively referred to as "input interfaces 110"), a network-on-chip of memory 120, N memory controllers $130_0$-$130_{N-1}$ (hereinafter collectively referred to as "memory controller 130"), and N channels (channel 0 to channel N−1) corresponding to the N memory controllers $130_0$-$130_{N-1}$, respectively. Generally, the number M of the input interfaces 110 is greater than the number N of the channels, to ensure that the total input bandwidth of the network-on-chip of memory 120 is not less than the total output bandwidth. In addition, the number M of the input interfaces 110 is set to be, large so as to control the quality of service (QoS).

The input interfaces 110 are configured to receive data to be transmitted and provide it to the network-on-chip of memory 120. The data to be transmitted may be assigned to one or more of the N channels through the network-on-chip of memory 120, and is then transmitted to corresponding memory controllers 130 through the one or more assigned channels.

Specifically, in the multi-channel interleaving technology, an interleaving granularity (interchangeably referred to as a channel data-granularity) is used to control a size of a data block that can be carried on each channel. For example, the channel data-granularity may be in bytes and may be, for example, 6413, 12813, 25613, or the like. Assuming that the number of the channels is eight, the channel data-granularity is 128 B, and 1 KB of data to be transmitted is received by the input interfaces 110, and in a case where a static mapping approach is adopted, the data to be transmitted may be assigned to each of the eight channels for transmission. In other words, 1 KB of data to be transmitted may be divided into eight data blocks of 128 B to be assigned to the eight channels for transmission. As can be seen, since each of the channels is necessary for transmitting the data, the data transmission would not proceed if any of the channel fails, which may result in a failure in the whole data processing system. Therefore, a dynamic mapping solution is proposed in the present disclosure.

In general, according to the embodiments of the present disclosure, an available channel mode and the channel data-granularity are obtained for a plurality of channels in a memory of a data processing system. The available channel mode indicates availabilities of the plurality of channels. For example, the available channel mode may be represented in binary, decimal, hexadecimal, or the like. When the available channel mode is represented in binary, a bit with a value of 1 indicates that the corresponding channel is available, while a bit with a value of 0 indicates that the corresponding channel is unavailable. For example, assuming that the number of the channels is 8, and the available channel mode is "10110111", channels 0, 1, 2, 4, 5 and 7 are available, while channels 3 and 6 are unavailable.

As described above, the channel data-granularity may control the sire of the data block that can be carried on each channel. For example, the channel data-granularity may be in bytes and may be, for example, 64 B, 128 B, 256 B, or the like.

Each, of the plurality of channels is associated with a set of addresses in the memory. Specifically, the channels to be used for transmission may be determined from the plurality of channels according to a target address of the data to be transmitted in the memory. Therefore, the principle of the dynamic mapping is to determine a translated address corresponding to the target address based on the available channel mode and the channel data-granularity, so that the data to be transmitted will be transmitted in the available channels and will not be transmitted in the unavailable channels, according to the translated address.

By take eight channels as an example, if it is detected that one channel unavailable, the interleaving will be performed on seven channels. That is, the data will be distributed to the seven available channels for transmission. Similarly, if it is detected that two channels fail, the interleaving will be performed on six channels. That is, the data will be distributed to the six available channels for transmission. In the present disclosure, the term "interleaving" refers to a manner in which the data is distributed to channels for transmission. In contrast, in the case where the static mapping is adopted, the entire data processing system would be unavailable as long as any unavailable channel exists.

In a case where the dynamic mapping approach is adopted, assuming that the yield of the data processing system is 60%, and the memory occupies 20% of the area of the data processing system, the yield may be improved by 8% (=(1−60%)*20%). In those cases where the memory occupies a larger area of the data processing system, such as a high-bandwidth memory (HEM), the yield and service life of the data processing system may be greatly improved.

In addition, the dynamic mapping may also improve the flexibility of the data processing system. For example, the Internet of Things (IoT) application has low requirements for bandwidth, and thus only applies the interleaving in part of the plurality of channels to reduce the costs.

Furthermore, in different applications or scenarios, the channel data-granularity may lead to different performance characteristics. As for this, the dynamic mapping may support dynamical changing of the channel data-granularity to adapt for different applications or scenarios.

Figure 2:
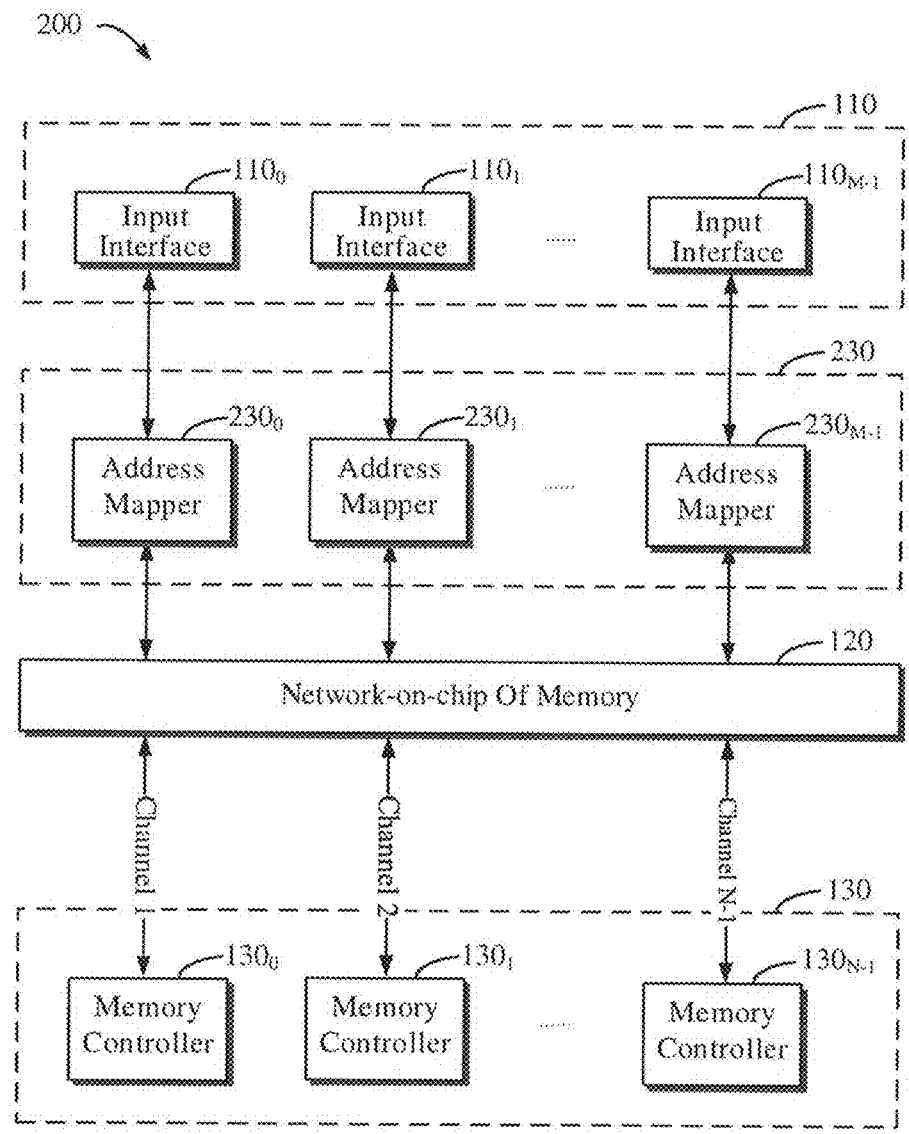
FIG. 2 is a schematic diagram showing a memory according to embodiments of the present disclosure.

Hereinafter, specific examples of the solution will be described in more detail in combination with FIGS. 2 to 8. It should be noted that although the solution is described by taking the multi-channel interleaving technology as an example, the solution may be used for managing any memory involving any transmission systems such as channel transmission and pipe transmission, FIG. 2 is a schematic diagram showing a memory 200 according to embodiments of the present disclosure. Similar to the memory 100 shown in FIG. 1, the memory 200 includes the M input interfaces $110_0$-$110_{M-1}$ (hereinafter collectively referred to as "input interfaces 110"), the network-on-chip of memory 120, and the N memory controllers $130_0$-$130_{N-1}$ (hereinafter collectively referred to as "memory controllers 130"), and the N channels (channel 0-channel N−1) corresponding to the N memory controllers $130_0$-$130_{N-1}$, respectively.

The memory 200 is different from the memory 100 in that the memory 200 further includes address mappers $230_1$-$230_{M-1}$ (hereinafter collectively referred to as "address mappers 230"). The address mappers 230 map a target address of the data to be transmitted in the memory to a translated address based on an available channel mode and a channel data-granularity of the N channels. According to the translated address, the data will be transmitted on the available channels, and not transmitted on the unavailable channels. For example, if channels 0, 1, 2, 4, 5 and 7 are available while channels 3 and 6 are unavailable, the data will be transmitted only on the available channels 0, 1, 2, 4, 5 and 7, and not transmitted on the channels 3 and 6.

It should be noted that although the address mappers 230 are shown as being disposed between the input interface 110 and the network-on-chip of memory 120 in FIG. 2, the address mappers 230 may be arranged at any position. For example, the address mapper 230 may be arranged inside or outside the memory, or even arranged outside the data processing system.

In the case where the address mappers 230 are adopted, the input interfaces 110 may receive the data to be transmitted and provide it to the address mappers 230. The address mappers 230 map the target address of the data to be transmitted in the memory to the translated address. The network-on-chip of memory 120 assigns the data to one or more available channels in the N channels according to the translated address. Then, the data to be transmitted is transmitted to the memory controllers 130 through the assigned available channels.

For example, assuming that the number of channels is eight, the channel data-granularity is 128 B, the available channel mode is "10110111", and 1 KB of data to be transmitted has been received through, the input interfaces 110, and in the case where the dynamic mapping is used, the data to be transmitted may be assigned to each of the six available channels for transmission. Specifically, the 1 KB of data to be transmitted may be divided into eight 128 B data blocks to be assigned to the six available channels for transmission.

In this way, even if some unavailable channels might exist in the data processing system, the data transmission may be implemented with the available channels. Consequently, the yield and service life of the data processing system may be improved. In addition, the solution may also support dynamical adaption to different applications or scenarios by setting the channel data-granularity and the available channel node, thereby improving the flexibility and adaptability of the data processing system.

Figure 3:
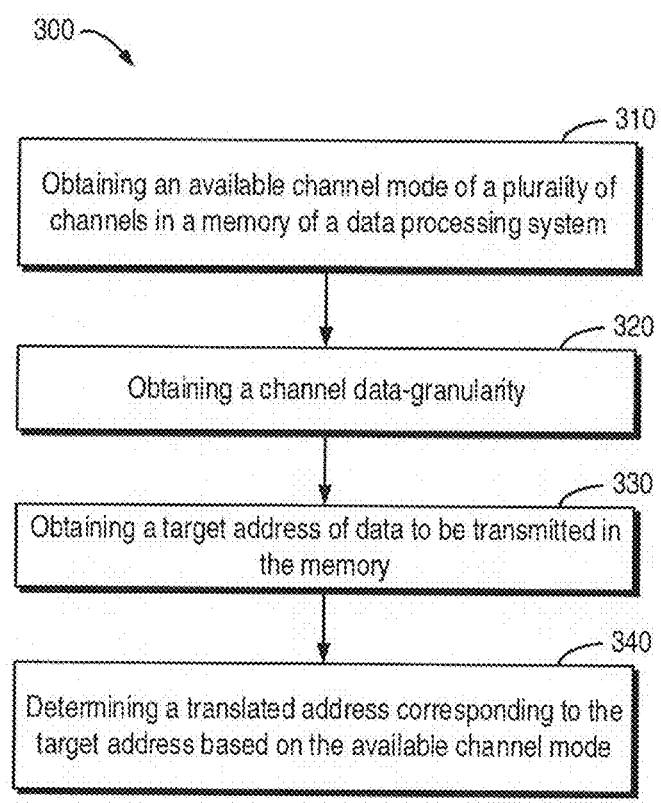
FIG. 3 is a flowchart showing a process for storage management according to some embodiments of the present disclosure.

FIG. 3 is a flowchart showing a process 300 for storage management according to some embodiments of the present disclosure. For example, the method 300 may be implemented in the address mapper 230 shown in FIG. 2 or other suitable devices. In addition, the method 300 may further include additional steps not shown, and/or some steps shown may be omitted. The scope of the present disclosure is not limited in this regard.

At block 310, the address mapper 230 obtains an available channel mode of a plurality of channels in the memory of a data processing system. As described above, each of the plurality of channels is associated with a set of addresses in the memory. In addition, the available channel mode indicates availabilities of the plurality of channels, and may be represented in binary, decimal, hexadecimal, or any other suitable form. In some embodiments, the address is 230 may obtain information related to unavailable channels in the plurality of channels, and determine the available channel mode by analyzing the information related to unavailable channels. For example, the information may indicate that channels 3 and 6 are damaged and unavailable. Accordingly, the available channel mode may be determined as "10110111".

At block 320, the address mappers 230 obtain a channel data-granularity. The channel data-granularity indicates a size of a data block that can be carried on each channel. For example, the channel data-granularity may be in bytes and may be, for example, 64 B, 128 B, 256 B, or the like. Furthermore, at block 330, the address mappers 230 may also obtain a target address of data to be transmitted in the memory. For example, the target address may be an address where the data to be transmitted is written to the memory.

Consequently, at block 340, the address mappers 230 determine a translated address corresponding to the target address based on the available channel mode and the channel data-granularity. In this way, according to the translated address, the data may be transmitted on available channels, and not transmitted on unavailable channels. In this manner, the yield, service life, flexibility, and adaptability of the data processing system may be improved.

Figure 4:
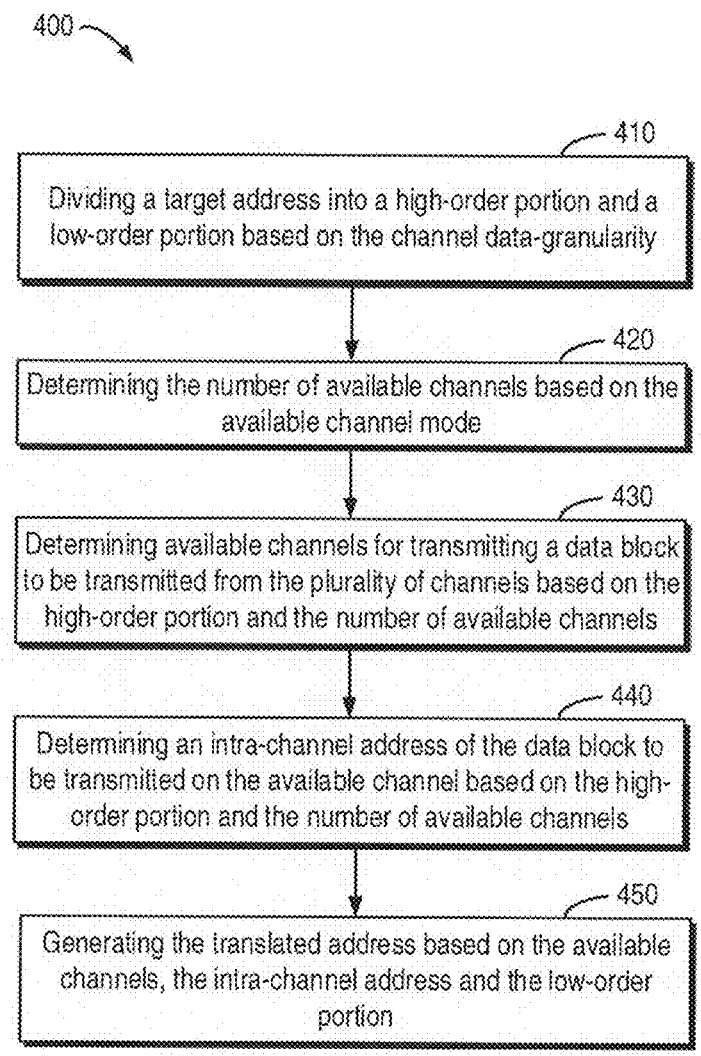
FIG. 4 is a flowchart showing another process for storage management according to some embodiments of the present disclosure.

A flowchart of a more detailed example process 400 for storage management according to some embodiments of the present disclosure will be described below with reference to FIG. 4. For example, the method 400 may be performed in the address mappers 230 shown in FIG. 2 or other suitable devices. In addition, the method 400 may further include additional steps not shown, and/or some steps shown may be omitted. The scope of the present disclosure is not limited in this regard.

At block 410, the address mappers 230 divide the target address into a high-order portion and a low-order portion based on the channel, data-granularity. The high-order portion of the target address corresponds to one data block in a set of data blocks that are associated with the data to be transmitted, and the low-order portion of the target address corresponds to a portion of the one data block.

For example, it is assumed that the target address is addr[AW-1:0], wherein AW represents the hit-width of the address, for example, 32 bit-width (AW=32). In addition, it is assumed that the channel data-granularity K is 256 B, and may be represent as 8 bits. That is, the bit-width KW of the channel data-granularity is 8. Consequently, the high-order portion addr[AW-1:KW] and the low-order portion addr[KW-1:0] may be generated based on the target address addr[AW-1:0] and the channel data-granularity. It may be understood that the high-order portion addr[AW-1:KW] may indicate a data block that can be, carried on one channel, and the low-order portion addr[KW-1:0] may indicate a specific address within the data block.

At block 420, the address mappers 230 determine the number of available channels based on the available channel mode. In a case where the available channel mode is "10110111", the address mappers 230 may determine that six channels are available. That is, the number of available channels is six. Alternatively, the address mappers 230 may obtain information related to unavailable channels in the plurality of channels, and determine the number of available channels by analyzing the information related to unavailable channels. For example, the information may indicate that channels 3 and 6 are damaged and unavailable. Accordingly, the lumber of available channels may be determined as six.

At block 430, the address mappers 230 determines the available channels for transmitting a data block to be transmitted from the plurality of channels based on the high-order portion and the number of available channels. In some embodiments, a modulus operation may be performed on the high-order portion and the number of available channels to determine the available channels. For example, the high-order portion addr[AW-1:KW] may be modulo-divided by the number N of available channels to obtain a modulus for selecting the available channels. For of understanding, this will be described in combination with FIG. 5, which illustrates a schematic diagram 500 showing dynamic address mapping according to some embodiments of the present disclosure.

In FIG. 5, it is assumed that the number of channel is 8, the available channel mode is "10110111" the number of available channels is 6, and the channel data-granularity is 256 B. The following description is provided by take a target address "0X05_XX" as an example, wherein "0X" indicates that the address represented in hexadecimal, represents the high-order portion of the address, and "XX" represents the low-order portion of the address. Since the low-order portion of the address is not involved in the determination of the available channels and the intra-channel address, it is generally referred to as "XX".

In this example, the high-order portion "05" is modulo-divided by the number 6 of available channels to obtain a modulus 5. Then, the available channels may be selected based on the modulus. For example, from low to high, the (modulus+1)th bit of the bits having a value of 1 in the available channel mode may be determined as the available channel for transmitting a data block associated with the high-order portion "05". Specifically, in the case where the modulus is 5, the channel indicated by the 6th bit (i.e., the (5+1)th) of the bits having the value of 1 in the available channel mode (i.e., 10110111), namely, channel 7, is determined as the as the available channel. As compared, the original channel of this data block is channel 5.

Referring to FIG. 4 again at block 440, the address mappers 230 determines an intra-channel address of the data block to be transmitted on the available channel based on the high-order portion and the number of available channels. The intra-channel address indicates an address of the data block in each channel. In some embodiments, the intra-channel address may be used to indicate the order in which the data blocks at transmitted through channels.

Figure 6:
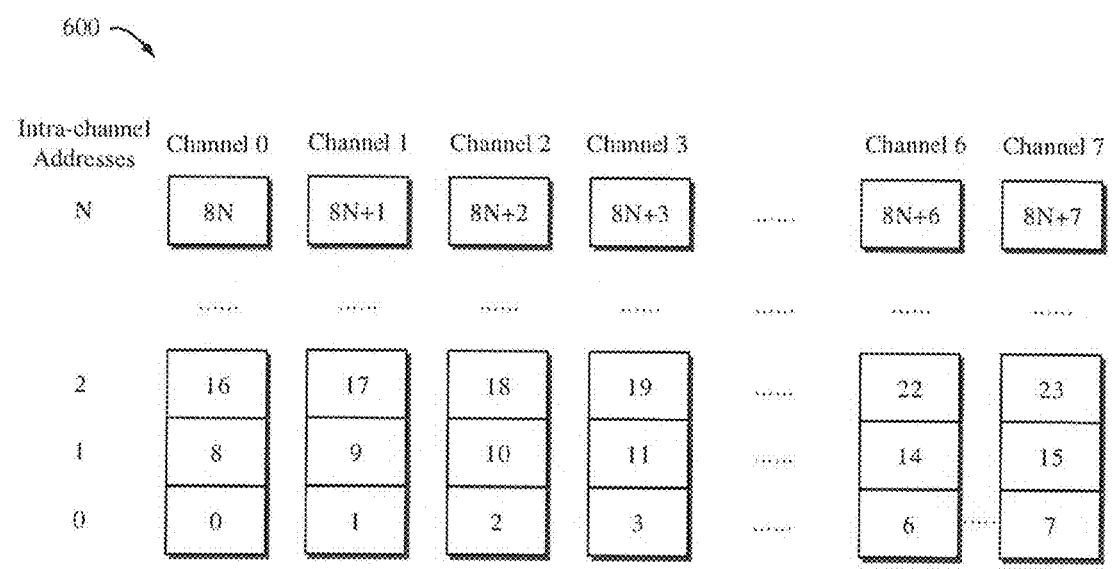
FIG. 6 is a schematic diagram showing intra-channel address s according to some embodiments of the present disclosure.

The intra-channel address will be described below with reference to FIG. 6. FIG. 6 is a schematic diagram 600 showing the intra-channel addresses according to some embodiments of the present disclosure. As shown in FIG. 6, the leftmost column represents the intra-channel addresses, such as 0–N. Each of the remaining columns represents one of the channels, such as channels 0-7. The number in each box indicates a serial number of a data block. In some embodiments the serial number may be indicated by the high-order portion of the address. Since the intra-channel address may indicate the order in which the data blocks are transmitted the channels, the data block 0 with an intra-channel address of 0 may be transmitted through a channel before the data block 8 with an intra-channel address of 1. Similarly, the data block 8 with the intra-channel address of 1 may be transmitted through the channel before the data block 16 with an intra-channel address of 2, and so on.

In some embodiments, the intra-channel address may be determined by performing a quotient operation on the high-order portion and the numb r of available channels. For example, as shown in FIG. 6, assuming that the available channel mode is "10110111", and the number of available channels is 6, the high-order portions "00" and "06" of the addresses may be divided by the number 6 of available channels to obtain the quotients of "0" and respectively. That is, the intra-channel addresses are "0" and "1", respectively. Furthermore, since both the data blocks associated with the high-order portions "00" and "06" of the addresses are determined to be transmitted through channel 0, and the intra-channel addresses of the two data blocks in channel 0 are "0" and "1", respectively, the data block associated with the high-order portion "0" of the address will be transmitted through channel 0 prior to the data block associated with the high-order portion "06" of the address.

With reference again to FIG. 4, at block 450, the address mappers 230 generate the translated address based on the available channels the intra-channel address and the low-order portion. In some embodiments, the high-order portion of the translated address may be determined based on the available channels and the intra-channel address, while the low-order portion of the translated address may be determined based on the low-order portion of the target, address. For example, assuming that the intra-channel address is represented as 1 bit in binary, and the available channels are represented as 3 hits in binary, in a case shown in FIG. 6, the intra-channel address for the target address "0X05_XX" is "0", and the available channel is "7" (i.e., "111" in binary). Accordingly, the high-order portion of the translated, address mar be determined as "07" (that is, "0111" in binary). In addition, the low-order portion of the target address "0X05_XX" is "XX". Accordingly, the low order portion of the translated address may be determined as "XX".

Consequently, according to the translated address that is obtained by mapping the target address dynamically in combination with the information related to the available channels, die data may be transmitted on the available channels, and not transmitted on the unavailable channels, thereby improving the yield and service life of the data processing system.

In addition, dynamic mapping may also improve the flexibility of the data processing system. In applications or scenarios with a low-bandwidth, only part of a predetermined bandwidth is required. For example, only four of eight channels may be needed. In such a case, by setting the available channel mode to be "11110000" and "00001111" alternately, four different channels may be utilized alternately. In this way, usage of the channels may be balanced, thereby improving the service life as compared to fixed usage of channels 0-3.

Figure 7:
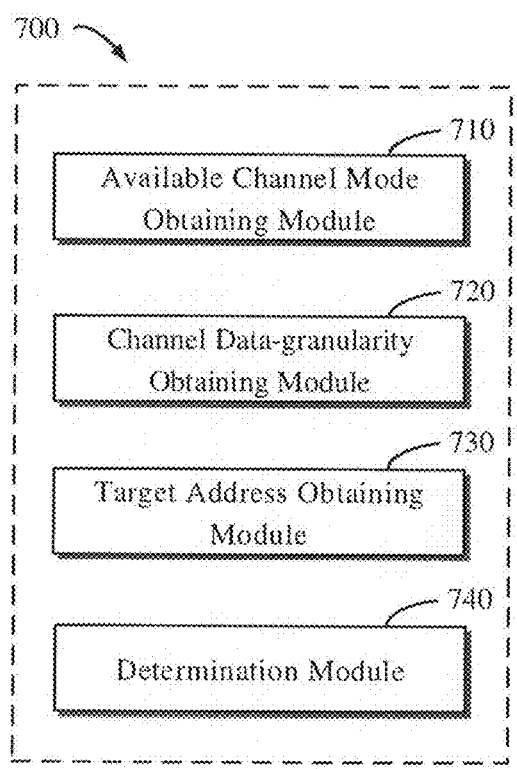
FIG. 7 is a block diagram showing an apparatus for storage management according to some embodiments of the present disclosure.

Further, in different application or scenarios, different channel data-granularities may lead to different performances. The dynamic mapping may support dynamical changing of the channel data-granularity to be adapted to different application or scenarios, FIG. 7 is a block diagram of an apparatus 700 for storage management according to some embodiments of the present disclosure. As shown in FIG. 7, the apparatus 700 includes: an available channel mode obtaining module 710, configured to obtain an available channel mode of a plurality of channels in a memory of a data processing system, the available channel mode indicating availabilities of the plurality of channels, and each of the plurality of channels being associated with a set of addresses in the memory; a channel data-granularity obtaining module 720, configured to obtain a channel data-granularity of the plurality of channels, the channel data-granularity indicating a size of a data block that can be carried on each channel; a target address obtaining module 730, configured to obtain a target address of data to be transmitted in the memory; and a determination module 740, configured to determine the translated address corresponding to the target address based on the available channel mode.

In some embodiments, the available channel mode obtaining module 710 includes; an unavailable channel information obtaining module, configured to obtain information related to unavailable channels in the plurality of channels; and an available channel mode determination module, configured, to determine the available channel mode based on the information related to the unavailable channels.

In some embodiments, the determination module 740 includes; an address dividing module, configured to divide the target address into a high-order portion and a low-order portion based on the channel data-granularity, the high-order portion corresponding to one data block in a set of data blocks that are associated with the data to be transmitted, and the low-order portion corresponding to a portion of the one data block; an available-channel number determination module, configured to determine the number of available channels based on the available channel mode; an available channel determination module, configured to determine the available channels for transmitting a data block to be transmitted from the plurality of channels based on the high-order portion and the number of available channels; an intra-channel address determination module, configured to determine an intra-channel address of the data block to be transmitted on the available channels; and a generation module, configured to generate the translated address based on the available channels, the intra-channel address and the low-order portion.

In some embodiments, the available channel determination module includes a modulus module, configured to perform a modulus operation on the high-order portion and the number of available channels to determine the available channel.

In some embodiments, the intra-channel address determination module includes a quotient module, configured to perform a quotient operation on the high-order portion and the number of available channels to determine the intra-channel address.

Figure 8:
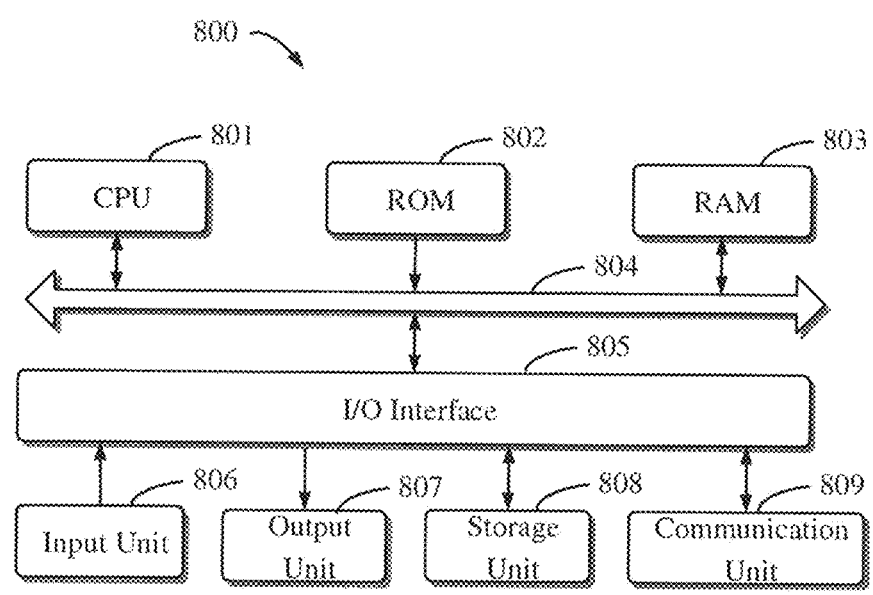
FIG. 8 is a schematic diagram showing a computing device capable of implementing some embodiments of the present disclosure.

FIG. 8 is a schematic diagram of an example device 800 capable of implementing the embodiments of the present disclosure. The device 800 may be configured to implement the address mappers 230 in FIG. 2. As illustrated in the figure, the device 800 includes a central processing unit (CPU) 801, which may perform various suitable actions and processes in accordance with computer program instructions stored in a read only memory (ROM) 802 or loaded from a storage unit 808 into a random access memory (RAM) 803. In the RAM 803, various programs and data necessary for operations of the device 800 may also be stored. The CPU 801, the ROM 802, and the RAM 803 are connected to each other through a bus 804. An input/output (I/O) interface 805 is also connected to the bus 804.

A number of components in the device 800 are connected to the I/O interface 805, including: an input unit 806 such as a keyboard, a mouse, and the like; an, output unit 807 such as various types of displays, speakers, etc.; the storage unit 808 such as a magnetic disk, an optical disk, or the like; and a communication unit 809 such as a network card, a modem, a wireless communication transceiver, and so on. The communication unit 809 allows the device 800 to exchange information/data with other devices via a computer network such as the Internet and/or various telecommunications networks.

The processing unit 801 performs the various methods and processes described above, such as any one of the processes 300 and 400. For example, in some embodiments, any one of the processes 300 and 400 may be implemented as a computer software program tangibly embodied on a machine-readable medium, such as the storage unit 808. In some embodiments, some or all of the computer programs may be loaded and/or installed onto the device 800 via the ROM 802 and/or the communication unit 809. When a computer program is loaded onto the RAM 803 and executed by the CPU 801, one, or more steps in any one of the processes 300 and 400 described above may be performed. Alternatively, in other embodiments, the CPU 801 may be configured to perform any one of the processes 300 and 400 in any other suitable manner (e.g., by way of the firmware).

The functions described herein above may be performed, at least in part, by one or more hardware logic components. For example, and without limitation, exemplary types of the hardware logic components that may be used include; a field programmable gate array (FPGA), an application specific integrated circuit (ASIC), an application specific standard product (ASSP), at system on chip (SOC), a complex programmable logic device (CPLD), and the like.

Program codes for performing the method in the present disclosure may be written in any combination of one or more programming languages. These program codes may be provided to a processor or controller in a general-purpose computer, a special purpose computer, or other programmable data processing devices, such that the program codes, when executed by the processor or controller, are configured to implement functions/operations specified in the flow chart and/or block diagrams. The program code may be executed entirely on a machine, partly on the machine, as a separate software package, partly on the machine, partly cm a remote computer, or entirely on the remote computer or server.

In the context of the present disclosure, the machine-readable medium may be a tangible medium that may contain, or store a program for use by or in combination with an instruction execution system, an apparatus, or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include: an electrical connection having one or more wires, a portable computer disk, a hard disk, a random access memory (RAM), a read only memory (ROM), an Erasable Programmable Read Only Memory (EPROM or a flash memory), an optical fiber, a compact disc read only memory (CD-ROM), an optical memory component, a magnetic memory component, or any suitable combination thereof.

Moreover, while operations are described in a particular order, this should be understood as that the operations are required to be performed in a particular illustrated order or in a sequential order, or that all illustrated operations are required to be performed to achieve desirable results. In certain circumstances, multitasking and parallel processing may be advantageous. Likewise, while several specific implementation details are included in the above discussion, these should not be construed as limiting the scope of the present disclosure. Certain features described in the context of separate embodiments may also be implemented in combination in a single implementation. Conversely, features that are described in the context of the single implementation may also be implemented in a plurality of implementations separately or in any suitable sub-combination.

Although the subject matter has been described in a language specific to structural features and/or methodological acts, it is to be understood that the subject matter defined in the attached claims is not necessarily limited to the specific features or acts described above. Instead, the specific features and acts described above are merely exemplary forms for implementing the attached claims.

What is claimed is:

1. A method for storage management, comprising:
    obtaining an available channel mode of a plurality of channels in a memory of a data processing system, the available channel mode indicating availabilities of the plurality of channels, and each of the plurality of channels being associated with a set of addresses in the memory;
    obtaining a channel data-granularity of the plurality of channels, the channel data-granularity indicating a size of a data block that can be carried on each channel;
    obtaining a target address of data to be transmitted in the memory; and
    determining a translated address corresponding to the target address based on the available channel mode and the channel data-granularity;
    wherein determining the translated address comprises:
    dividing the target address into a high-order portion and a low-order portion based on the channel data-granularity, the high-order portion corresponding to one data block in a set of data blocks that are associated with the data to be transmitted, and the low-order portion corresponding to a portion of the one data block;
    determining the number of available channels based on the available channel mode;
    determining the available channels for transmitting a data block to be transmitted from the plurality of channels based on the high-order portion and the number of available channels;
    determining an intra-channel address of the data block to be transmitted on the available channels based on the high-order portion and the number of available channels; and
    generating the translated address based on the available channels, the intra-channel address and the low-order portion.

2. The method according to claim 1, wherein obtaining the available channel mode comprises:
    obtaining information related to unavailable channels in the plurality of channels; and
    determining the available channel mode based on the information related to the unavailable channels.

3. The method according to claim 1, wherein determining the available channels comprises:
    performing a modulus operation on the high-order portion and the number of available channels to determine the available channels.

4. The method according to claim 1, wherein determining the intra-channel address comprises:
    performing a quotient operation on the high-order portion and the number of available channels to determine the intra-channel address.

5. An apparatus for storage management, comprising:
    one or more processors; and
    tangible, non-transitory computer-readable memory for storing instructions executable by the one or more processors to cause the device to implement a method for storage management, the method comprising:
    obtaining an available channel mode of a plurality of channels in a memory of a data processing system, the available channel mode indicating availabilities of the plurality of channels, and each of the plurality of channels being associated with a set of addresses in the memory;
    obtaining a channel data-granularity of the plurality of channels, the channel data-granularity indicating a size of a data block that can be carried on each channel;
    obtaining a target address of data to be transmitted in the memory; and
    determining a translated address corresponding to the target address based on the available channel mode and the channel data-granularity;
    wherein determining the translated address comprises:
    dividing the target address into a high-order portion and a low-order portion based on the channel data-granularity, the high-order portion corresponding to one data block in a set of data blocks that are associated with the data to be transmitted, and the low-order portion corresponding to a portion of the one data block;
    determining the number of available channels based on the available channel mode;
    determining the available channels for transmitting a data block to be transmitted from the plurality of channels based on the high-order portion and the number of available channels;

determining an intra-channel address of the data block to be transmitted on the available channels based on the high-order portion and the number of available channels; and generating the translated address based on the available channels, the intra-channel address and the low-order portion.

6. The apparatus according to claim 5, wherein obtaining the available channel mode comprises:

obtaining information related to unavailable channels in the plurality of channels; and determining the available channel mode based on the information related to the unavailable channels.

7. The apparatus according to claim 5, wherein determining the available channels comprises:

performing a modulus operation on the high-order portion and the number of available channels to determine the available channels.

8. The apparatus according to claim 5, wherein determining the intra-channel address comprises:

performing a quotient operation on the high-order portion and the number of available channels to determine the intra-channel address.

9. A tangible, non-transitory computer readable storage medium having a computer program stored thereon, wherein, when the program is executed by a processor, the program implements a method for storage management, the method comprising:

obtaining an available channel mode of a plurality of channels in a memory of a data processing system, the available channel mode indicating availabilities of the plurality of channels, and each of the plurality of channels being associated with a set of addresses in the memory;

obtaining a channel data-granularity of the plurality of channels, the channel data-granularity indicating a size of a data block that can be carried on each channel;

obtaining a target address of data to be transmitted in the memory; and determining a translated address corresponding to the target address based on the available channel mode and the channel data-granularity;

wherein determining the translated address comprises:

dividing the target address into a high-order portion and a low-order portion based on the channel data-granularity, the high-order portion corresponding to one data block in a set of data blocks that are associated with the data to be transmitted, and the low-order portion corresponding to a portion of the one data block;

determining the number of available channels based on the available channel mode;

determining the available channels for transmitting a data block to be transmitted from the plurality of channels based on the high-order portion and the number of available channels;

determining an intra-channel address of the data block to be transmitted on the available channels based on the high-order portion and the number of available channels; and generating the translated address based on the available channels, the intra-channel address and the low-order portion.

10. The tangible, non-transitory computer readable storage medium according to claim 9, wherein obtaining the available channel mode comprises:

obtaining information related to unavailable channels in the plurality of channels; and determining the available channel mode based on the information related to the unavailable channels.

11. The tangible, non-transitory computer readable storage medium according to claim 9, wherein determining the available channels comprises:

performing a modulus operation on the high-order portion and the number of available channels to determine the available channels.

12. The tangible, non-transitory computer readable storage medium according to claim 9, wherein determining the intra-channel address comprises:

performing a quotient operation on the high-order portion and the number of available channels to determine the intra-channel address.

* * * * *